United States Patent [19]

Gerszberg et al.

[11] Patent Number: 5,608,780
[45] Date of Patent: Mar. 4, 1997

[54] WIRELESS COMMUNICATION SYSTEM HAVING BASE UNITS WHICH EXTRACTS CHANNEL AND SETUP INFORMATION FROM NEARBY BASE UNITS

[75] Inventors: Irwin Gerszberg, Kendall Park; Eugene T. Kendig, Sea Girt; Jesse E. Russell, Piscataway, all of N.J.

[73] Assignee: Lucent Technologies Inc., Murray Hill, N.J.

[21] Appl. No.: 522,795

[22] Filed: Sep. 1, 1995

Related U.S. Application Data

[63] Continuation-in-part of Ser. No. 158,089, Nov. 24, 1993, abandoned.

[51] Int. Cl.⁶ .................................................. H04Q 7/20
[52] U.S. Cl. ............................. 379/58; 379/60; 455/33.2
[58] Field of Search ..................... 379/58, 60; 455/33.1, 455/33.2; 370/95.3

[56] References Cited

U.S. PATENT DOCUMENTS

| | | | |
|---|---|---|---|
| 4,284,848 | 8/1981 | Frost | 179/2 EB |
| 5,239,676 | 8/1993 | Strawczynski et al. | 455/33.2 |
| 5,265,119 | 11/1993 | Gilhousen | 375/1 |
| 5,265,150 | 11/1993 | Helmkamp et al. | 379/58 |
| 5,315,637 | 5/1994 | Breeden | 379/58 |
| 5,325,419 | 6/1994 | Connolly et al. | 379/60 |
| 5,371,780 | 12/1994 | Amitay | 379/58 |
| 5,384,826 | 1/1995 | Amitay | 379/60 |

OTHER PUBLICATIONS

Weib, Wizgall, "System 900: The ISDN Approach to Cellular Mobile Radio", Electrical Communication, vol. 63, #4, 1989.

Ballard, Issenmann, "Digital Cellular Mobile-Radio System ECR 900," European Transactions on Telecommunications Jan. 1990.

Dunlop, Khan, Gormley, "A Packet Based System for Cellular Digital Mobile Radio Applications," 1992 IEEE.

*Primary Examiner*—William Cumming
*Attorney, Agent, or Firm*—Alfred G. Steinmentz

[57] ABSTRACT

A wireless communication system for servicing personal communicators is connected to a a digital switch of a landline telephone network. The communication system includes a plurality of wireless communication base units, each having wireless circuitry enabling it to extract channel and setup information other from nearby wireless communication base units. Each unit measures the RSSI of channels of neighboring wireless communication base units and makes channel assignments to a base unit in response to RSSI measurements being compared to a threshold.

8 Claims, 5 Drawing Sheets

WIRELESS COMMUNICATION SYSTEM HAVING BASE UNITS WHICH EXTRACTS CHANNEL AND SETUP INFORMATION FROM NEARBY BASE UNITS

This application is a continuation-in-part of application Ser. No. 08/148,098, filed on Nov. 24, 1993 now abandoned. This application was filed coincident with applications Ser. No. 08/158,088 and 08/158,090.

FIELD OF THE INVENTION

This invention relates to wireless radiotelephone communication systems and in particular to a local area radiotelephone communication system in which a plurality of intelligent wireless communication base stations operate in direct cooperation with each other and with an intelligent switch of a landline telephone network.

BACKGROUND OF THE INVENTION

Conventional Cellular systems use base stations (commonly referred to as cell-sites) which cover small geographical areas (referred to as cells). Several cell-sites are connected to a master controller called the Mobile Telephone Switching Office (MTSO). The connection between the MTSO and a cell-site is usually by T1 lines which carry voice traffic as well as a data link. The MTSO is responsible for control of the cell-sites as well as providing an interface connection to the Public Switched Telephone Network (PSTN).

The service area that a cell-site covers is generally on the order of square miles and the transmitters of the cell-sites generally radiate about 500 Watts effective power.

In addition to voice channels each cell-site is provided with one special setup channel utilized for communicating control information between mobile radiotelephone units and the cell-site. When a mobile radiotelephone unit is turned on it scans the setup channels and locks onto the strongest channel. This usually results in the mobile radiotelephone unit selecting the nearest cell-site.

Current mobility management, allowing mobile radiotelephones to switch serving cell-sites, is carried out by using a data link through the MTSO to transfer mobility management messages from one cell-site to another. Current channel assignment and neighbor lists must be "RF engineered" before the system is placed into service.

In a mobile-originated call the mobile radiotelephone unit seizes the dominant setup channel and sends a message to the cell-site requesting service. The cell-site passes this information back to the MTSO which decides if the call should go through. It determines if there are available facilities (radio channel units, facilities to the PSTN, enough signal strength etc.) and if the user has dialed a valid directory number. The MTSO then sends a message to the mobile radiotelephone unit (via the forward control channel of the cell-site) and assigns a voice channel to it. Upon the cell-site determining that the mobile has tuned to the correct voice channel, the cell-site sends a voice confirmation message to the MTSO where any remaining switching tasks are completed.

The cellular network provides mobility to the user through a mechanism referred to as "handoff". Cell-sites which are geographically adjacent are considered to be neighbor cell-sites. These are the cell-sites that a call can be transferred to as a mobile radiotelephone unit moves past the current cell-site boundary. This transferring of a call from one cell-site to another is called a handoff. The translation paramenters, which specify which cell-sites are to be considered in a handoff process, are included in a table called the "neighbor list". The neighbor list for each cell is constructed during the "RF engineering" stage by the service provider.

During a call the cell-site will send a message to the mobile radiotelephone unit asking it to make an RSSI measurement on a particular channel. The cell-site selects the channel the mobile uses to make this measurement. This selection is based on the information contained in its neighbor list for that particular cell-site. The mobile reports this information back to the cell-site which stores that information for later use. When the RSSI level drops below a predetermined level the cell-site can then make the decision of whether to hand the call off to another cell-site based on the RSSI levels of neighboring cell setup channels reported by the mobile. If the decision is made to handoff the call, one cell-site communicates to another cell-site over the data links using a wireline connection between themselves and the MTSO.

A new version of wireless radiotelephone service, commonly identified as personal communication networks (PCN) similarly uses a localized base station or radio port communication sites much smaller in service area than a cell-site and analogous to the microcell to radiate and provide radiotelephone service within small limited local areas. PCN is normally dedicated only to a small local area of service and is not configured in a radiotelephone communication system as pan of a frequency reuse wide area pattern. Typically these radio ports are directly interconnected with the landline telephone network and do not provide for hand-off from one radio port to another.

SUMMARY OF THE INVENTION

A wireless communication system for servicing personal communicators is connected to a digital switch of a landline telephone network. The communication system includes a plurality of wireless communication base units, each having wireless circuitry enabling it to extract channel and setup information from nearby wireless communication base units. Each unit measures the RSSI of channels of neighboring wireless communication base units and makes channel assignments to a base unit in response to RSSI measurements being compared to a threshold.

DETAILED DESCRIPTION

Figure 1:
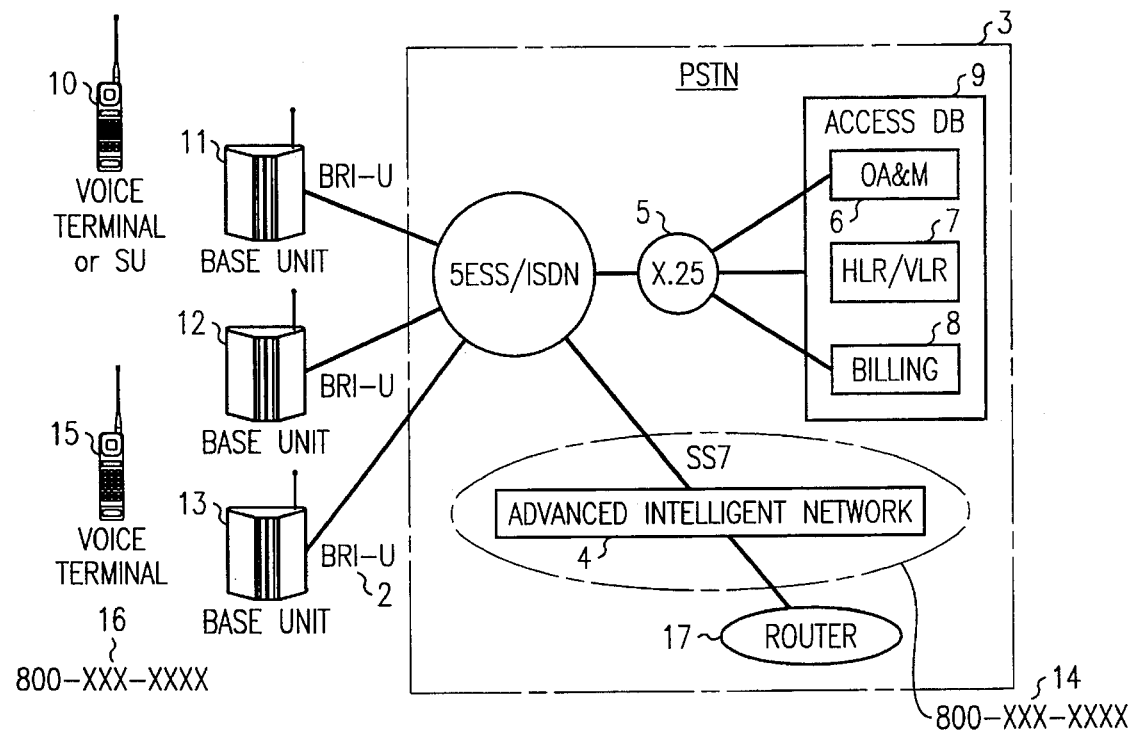
FIG. 1 is a block schematic of a wireless communication system.

The overall communication system is shown in the FIG. 1. A Wireless Personal Communication Base Unit 11, 12 or 13 is designed to interface by a digital line connection with the ISDN switch of a Public Switched Telephone Network at the S/T reference point. Mobile telephone terminals 10, 15 registered with one base unit re-register with other Wireless Personal Communication Base Units as it moves throughout a PCS (Personal Communication Service) coverage area. A Wireless Personal Communication Base Unit can handle two simultaneous calls. In FIG. 1 a landline originated call designated 14, has its call path routed by control of the Advanced Intelligent Network 4. The advanced intelligent network will route the call to a Wireless Personal Communication Base Unit 13 where the desired mobile terminal number 16 is registered. The Wireless Personal Communication Base Unit 13 pages the desired terminal 15 on a digital setup channel. If the terminal 15 responds, the Wireless Personal Communication Base Unit 13 proceeds in setting up the call. During the setup routine, the terminal 15 will be assigned an ISDN 64 kb/s B channel and a radio frequency time slot channel. The main controller contained within the Wireless Personal Communication Base Unit 13 will configure the RF transmitter to tune to the assigned frequency channel. It will then connect the audio path between baseband processor and the ISDN interface sub-modules which are all contained within the Wireless Personal Communication Base Unit 13. For a terminal originated call, the main controller will set up the call, connect the audio path and ring the desired number through the Network. Upon termination of the call by either side, the main controller will drop the call.

As shown in FIG. 1 upon initialization or power up of the Wireless Personal Communication Base Unit 11 scans the current active setup channel of one of its neighboring Wireless Personal Communication Base Units 12 and 13. Upon this initialization sequence a service request will be initiated from Wireless Personal Communication Base Unit 11 to Wireless Personal Communication Base Units 12 and 13. All Wireless Personal Communication Base Units 11, 12, and 13 will then store the their neighbors identity and setup channel information communicating through the X.25 communications network 5. This information exchange will continue between Wireless Personal Communication Base Units 11, 12, and 13 until all of the neighboring Wireless Personal Communication Base Units have been identified and the neighbor list database has been populated. Upon power up, a Wireless Personal Communication Base Unit will execute its initialization and self test tasks. In addition, each Wireless Personal Communication Base Unit performs RF self engineering. Self engineering is accomplished by scanning RF channels and taking RSSI measurements. The channels that have RSSI measurements below a certain threshold are considered available for the Wireless Personal Communication Base Unit to use. Otherwise, the RF channel will be considered in use. The priority of the initialization serviced by each Wireless Personal Communication Base Unit will be dependent upon the level of RSSI, BER and FER component with the neighboring Wireless Personal Communication Base Unit measures. These levels will be pre-determined by each individual threshold table. The information contained in these tables will be; RSSI less than RSSI minimum, RSSI more than RSSI maximum, BER more than BER maximum, and FER more than FER maximum. When a new Wireless Personal Communication Base Unit is needed to provide more sufficient service in a given registration area the new Wireless Personal Communication Base Unit will register in a fashion similar to self configuration.

Mobility Management can be accomplished between Wireless Personal Communication Base Units 11 and 12 over the RF link which eliminates the need for signaling through the wireline network. Wireless Personal Communication Base Units 11, 12, & 13 are positioned in the same vicinity close enough to each other that they can receive each others setup channel messages. The setup channels can be tuned to have a greater radiating distance than the voice channels. Considering FIG. 1 it is the network 4 that must keep track of a single user at all times. There are several scenarios of mobility management functionality to consider using Peer to Peer communications between Wireless Personal Communication Base Units.

Mobility is the service attribute which allows a terminal to register in a registration area covered by an Access Manager database other than the home Service Area and perhaps through another service providers Wireless Personal Communication Base Unit. The visited registration area of units 12 and 11 gives the home service area (end user profile and registration information resides in the home HLR/VLR 7) routing information. Upon registration in the visiting service area a subscriber is assigned a temporary subscriber identity by the host network which is used as a routing address to alert the terminal. The network database structure of the Wireless Personal Communication Base Units provides personal directory numbers and physical port locations that are dynamically assigned at every call, and at every hand-over to another Wireless Personal Communication Base Unit. Through dynamic assignment personal and group directory numbers can be used irrespective of location, in addition to providing access to the host network. The service providers should not be responsible for clearing old registrations. Upon new registration to a given service area the previous registration should be cleared or updated with new registration information. Subscriber 15, FIG. 1 enters a geographical area serviced by different Wireless Personal Communication Base Unit 12 or 11. Neighboring information is contained within the neighbor list database of the new Wireless Personal Communication Base Unit and it is not necessary to query the AIN 4 for information pertaining to that particular subscriber 15. Considering service has already been provided in the previous Wireless Personal Communication Base Unit 13, peer to peer communications between Wireless Personal Communication Base Units 12 and 13 eliminate the need to go back to the Network 4. A RPhandoff_Query message will be sent from Wireless Communication Personal Communication Base Unit 13 to Wireless Personal Communication Base 12 inquiring if Wireless Personal Communication Base Unit 12 can take an additional terminal or subscriber 15 over its neighboring setup channel into its servicing local. Service for 15 will be provided if an RPhandoff_ack is received from Wireless Personal Communication Base Unit 12. In the event service cannot be granted by Wireless Personal Communication Base Unit 12 a RPhandoff_nak will be sent as a result indicating subscriber service cannot be granted at the time to Wireless Personal Communication Base Unit 13. As a result of confirmed and non-confirmed handoffs within a given Wireless Personal Communication Base Unit service area messages will be passed between the servicing Wireless Personal Communication Base Units 11, 12, and 13 to the network router 17 and the databases OA&M, HLR/VLR, and BILLING will be populated accordingly with mobility information such as current location, service area, and visitor location information. The mobility router 17 will need this information to route calls and provide the proper custom calling features information to the different service providers.

Figure 2:
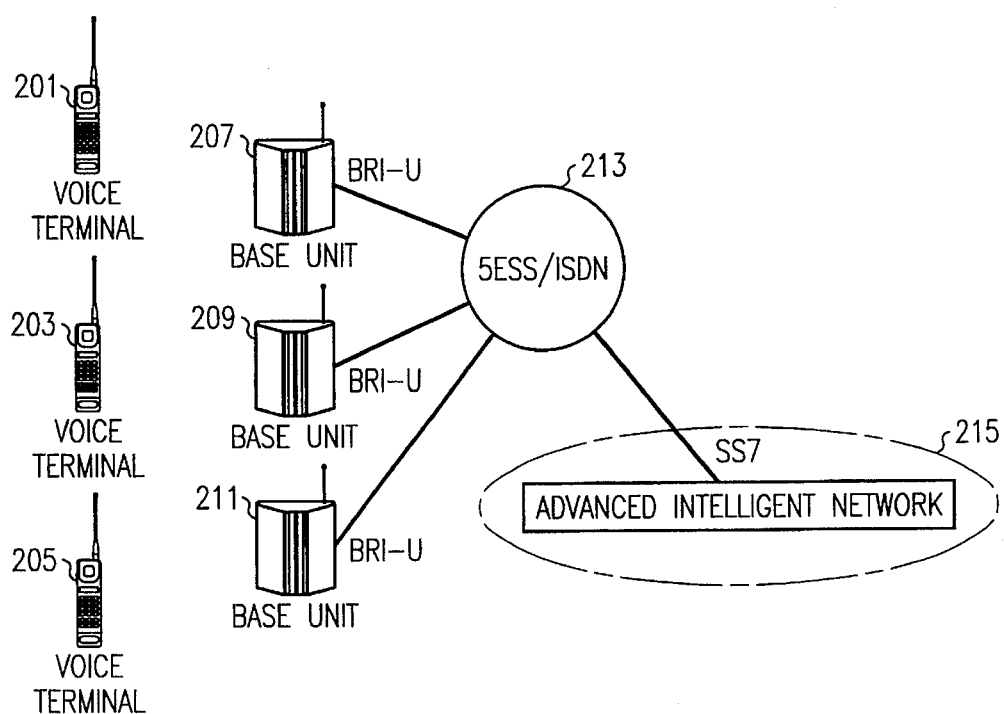
FIG. 2 is a block schematic of a modification to the system of FIG. 1.

FIG. 2 is a simplified diagram of the Wireless Communication Base Unit network. Referring to the figure, voice terminal 201 enters service area designated to base units 207. A base unit, in this instance 207 will receive a registration message from terminal 201. Each base unit can handle 2 simultaneous calls. The second terminal 203 enters the same service ara designated to base units 207. The third terminal 205 enters service area designated to base units 207. Since terminals 201 and 203 already are being provided service by base unit 207 terminal 205 will be denied service normally because there is capacity restraints on base unit 207. However, a solution is to measure RSSI levels utilizing peer to peer communications utilizing radio communications over the setup channel or by Integrated Digital Services utilizing D-Channel packet information. With this scenario referring to FIG. 2, base unit 209 with an unused channel can boost its own RSSI level based on information queried or retrieved from base unit 207 in a means responsive to a request for assistance to service terminal 205. In this way an adjacent base unit can boost the RSSI level to accomodate for the new user.

Figure 3:
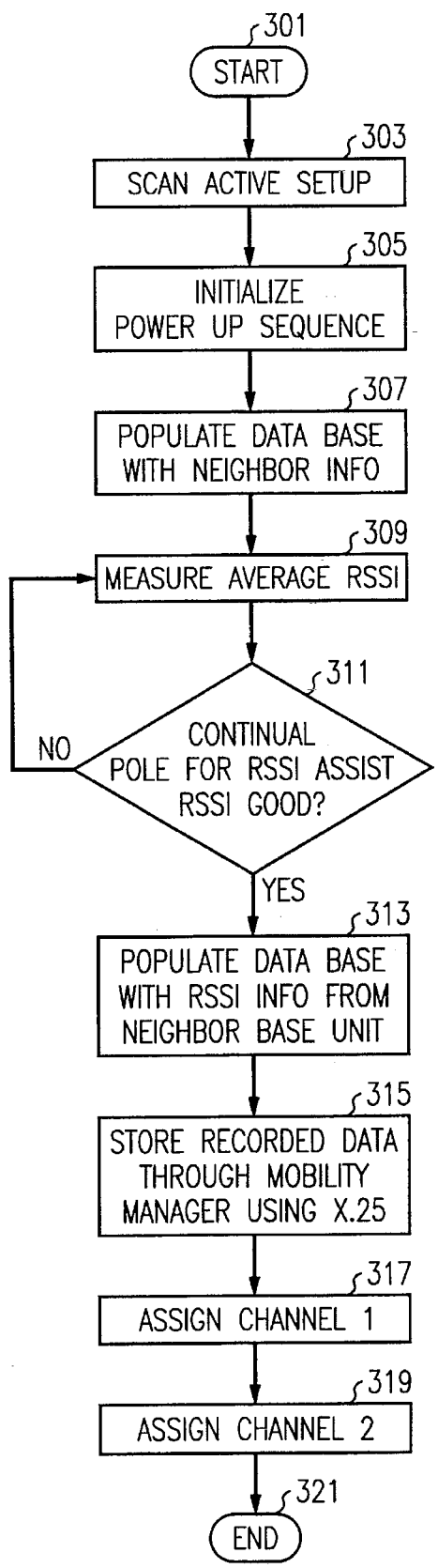
FIG. 3 is a flow chart showing an operation process of the wireless communication system.

The flowchart of FIG. 3 shows graphs on processes described above.

Terminal 301 is the entry way to the process and is followed by the instructions of block 303 which have the base station radio scan to locate any active setup channel. Its power up sequence is initialized as expressed by the instructions of the bock 305. Data gathered from the scan, identifying neighboring base units is used to populate a data base included within the base station, as per the instructions of block 307. RSSI of detected signals are measured, as per the instructions of block 309, to generate an average RSSI level the instructions of block 311 cause a pooling of RSSI levels and determining a sufficient RSSI level. Having determined the good RSSI the data base of the base station is populated, as per the instructions of block 313, with the RSSI data of neighboring base units. This recorded data is stored, as per block 3 15, and channels are assigned accordingly in blocks 317 and 319. The flow terminates at terminal 321.

Figure 4:
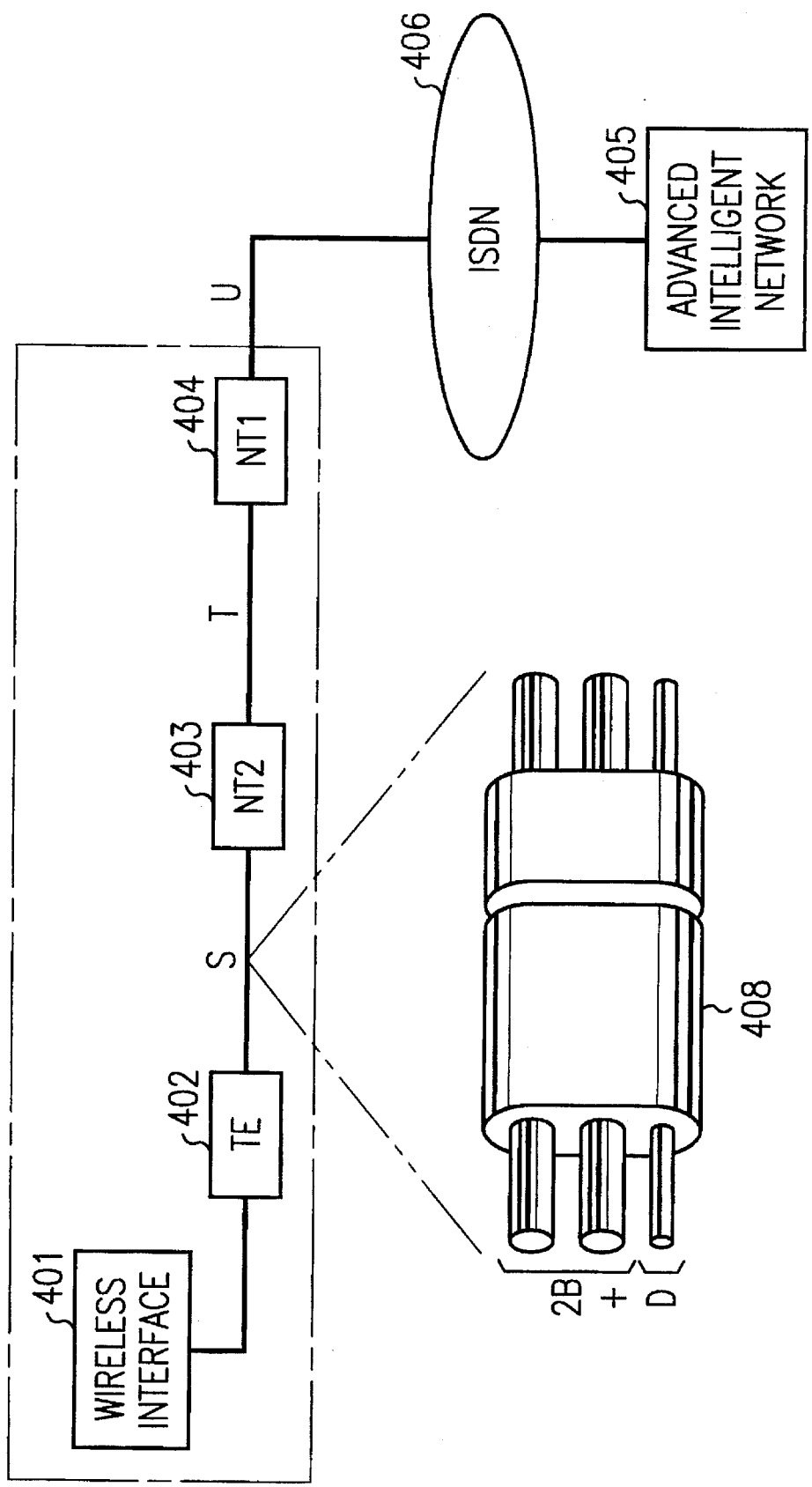
FIG. 4 shows the base unit to network interface.

In the schematic of FIG. 4 the base unit to network interface is shown. A wireless interface unit 401 is provided for connecting to base station radio and transmission equipment. This wireless interface is connected to the terminal end 402 which in turn is connected to the network termination NT2 403, via an S reference point. Reference points, defined by ITU recommendation Q.961, are known to those skilled in the art and hence are not described in detail. The termination NT2 403 is coupled to the network termination NT1 404, via a T reference point. NT1 404 is connected, via a U reference point, to an ISDN switched network 406, having control input from an advanced intelligent network 405. In the preferred embodiment the interface will be referenced to the U reference point. The preferred channel is a 2B+D 408 such as shown for the S reference point, where the channel includes two bearer paths plus a data path. The data path is used for control signaling and the two bearer paths are used for voice and data transmission.

Figure 5:
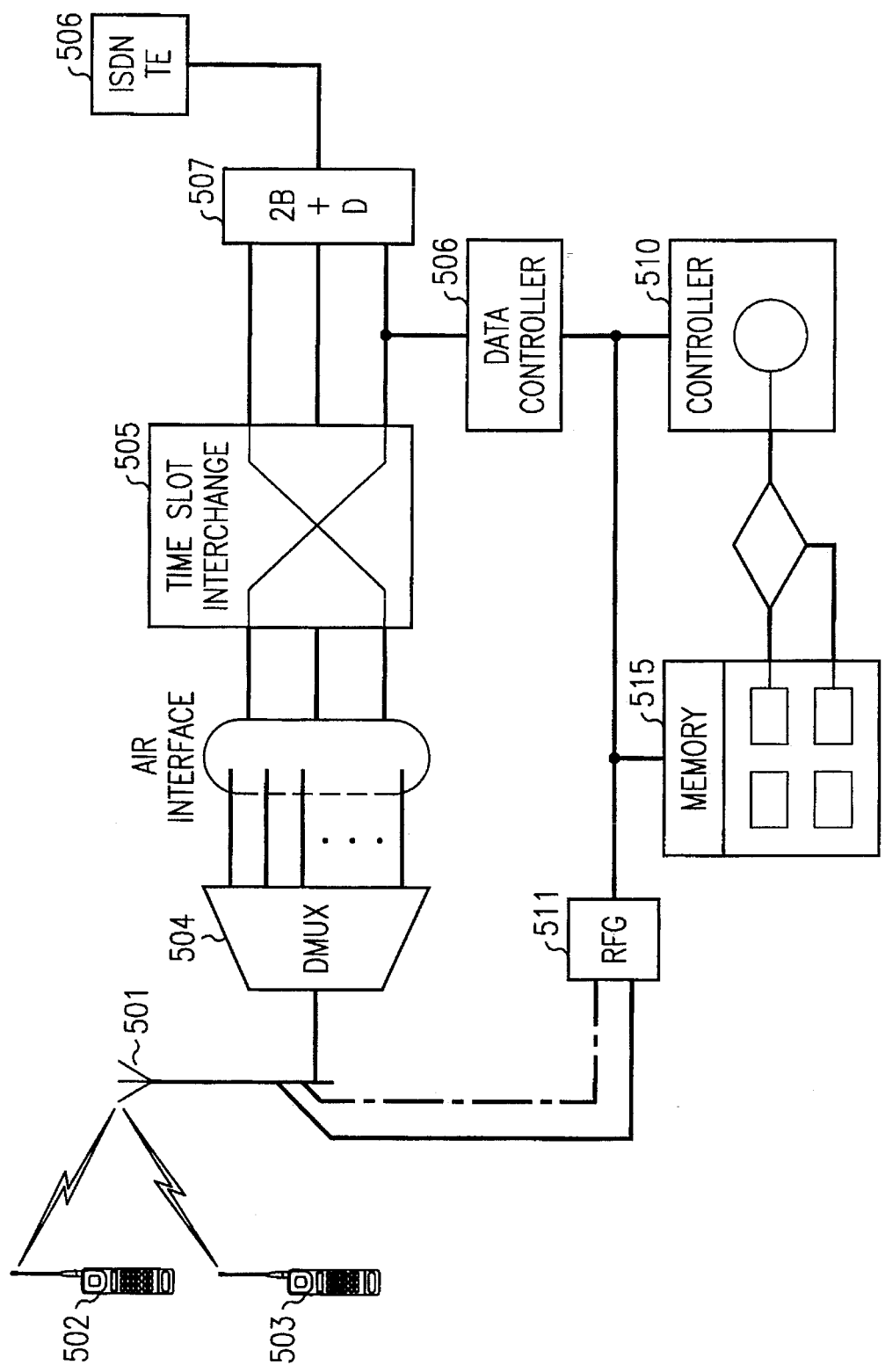
FIG. 5 shows the base unit in block schematic.

The base unit itself is shown in block schematic in the FIG. 5. Two mobile terminals 502 and 503 are shown communicating with an antenna 501 of the base unit. Demultiplexer 504 is connected to the antenna and couples it to the time slot interchange 505 which handles the time slot modulation and converts it a form suitable for a 2B+D channel 507 coupled to the ISDN terminal end 506. The D line is under control of data controller 509 and is in turn is controlled by base station controller 510. Controller 510 also controls reference frequency generating circuit 511 which supplies the channel frequencies to select the the air interface channel. Memory 515 provides tables (e.g., RSSI, set up channels, mobile & station IDs, etc.) in which the data is stored for establishing a tabular data base in each base station. The RSSI values are used to determine the service area extent of a particular wireless base terminal.

Figure 6:
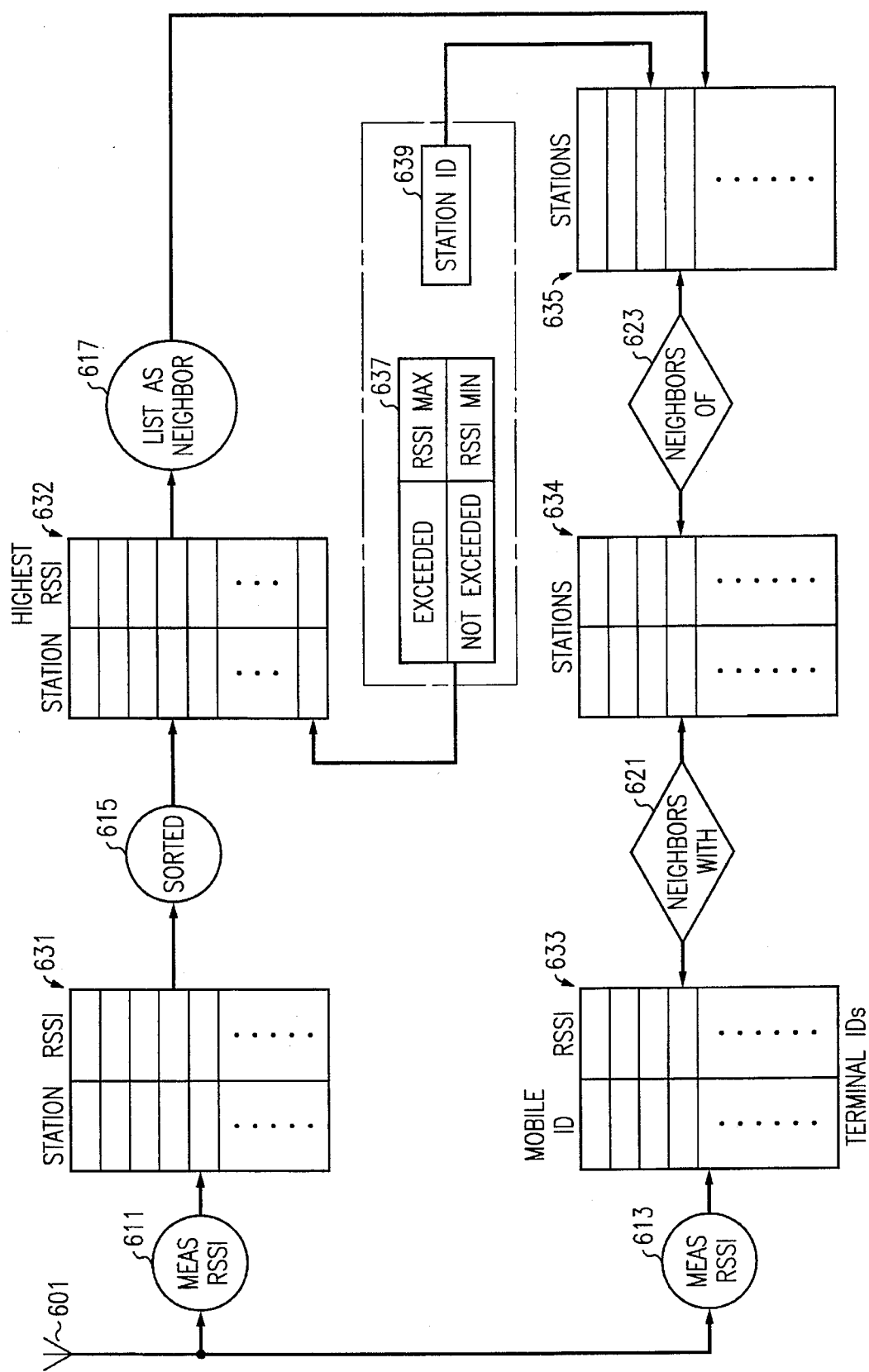
FIG. 6 shows the memory structure and interrelationship.

The memory structure and interrelationships are symbolically illustrated in the FIG. 6. In the figure the circular elements 611, 613, 615 and 617 designate operations on the tables in memory and diamond symbols 621 and 623 indicate relationships between tables in memory. An incoming signal, to antenna 601, is measured for its RSSI by operation module 611 and its information is stored in the memory table 631 which stores the station ID and its recorded RSSI. This information is subjected to a sorting operation by operation module 615 and stored in the tabular memory 632. Operation module 617 develops a neighbor list and sorts it in the memory table 635.

Operation module 613, connected to the antenna 601, determines the RSSI of mobile stations and stores this information in memory table 633. Relation module 621 registers these mobile stations with base stations and relation module 623 creates a relation with which base stations are designated neighbors of other base stations.

In block 637 the standards of RSSI maximums and minimums are established and in block 639 the station IDs associated within these limits are identified.

What is claimed is:

1. A radiotelephone communication system including a plurality of wireless communication base stations;

digital line connections each connecting one of the plurality of wireless communication base stations to a digital integrated service telephone switch and its data included in a landline telephone network, and operative for accessing, through the digital integrated service telephone switch, each others setup and control channel information; and an adjunct advanced intelligent network means connected to the digital integrated service telephone switch;

each wireless communication base station including means for communicating by radio signals with another one of the plurality of wireless communication base stations including scanning its setup channels and utilizing data acquired for initialization of its circuits; and including means to register and control calls from and to mobile telephone terminals, including means to tune frequencies and connect an audio path to a landline telephone network;

means included in the first and second wireless communication base stations for responding to the data acquired and setting a configuration state common to the plurality of wireless communication base stations;

the advanced intelligent network controlling routing of calls to the wireless communication base stations and to the registered mobile telephone terminals;

each wireless communication base station accepting responses of mobile telephone terminals to set up calls and commands to terminate calls with mobile telephone terminals;

means within each wireless communication base station to select mobile telephone terminals to service and to designate others of the plurality of wireless communication base stations as neighbors based on RSSI (Received Signal Strength Indicator) signal strength measurements and to use the RSSI strength measurements to limit service area.

2. A radiotelephone communication system including a plurality of wireless communication base stations, as claimed in claim 1; wherein:

the wireless communication terminal, includes:

a memory for storing wireless communication base station and mobile telephone station identities;

a controller responsive to the memory for controlling frequency selection based on memory content.

3. A radiotelephone communication system including a plurality of wireless communication base stations, as claimed in claim 2; wherein:

the memory is structured in tabular format including a table of wireless communication base station identities, a table of RSSI values correlated to wireless communication base station identities, a table of mobile identities correlated to RSSI values, and a table of wireless communication base stations correlated to highest RSSI values.

4. A radiotelephone communication system including a plurality of wireless communication base stations, as claimed in claim 3; wherein:

the controller includes stored instructions for measuring RSSI values and means for sorting wireless communication base stations with with RSSI values according to signal strength.

5. A radiotelephone communication system including a plurality of wireless communication base stations, as claimed in claim 4; wherein:

the controller further includes means for relating wireless communication base stations as neighbors of one another.

6. A radiotelephone communication system as claimed in claim 1, wherein:

the advanced intelligent network is connected for controlling information flow between individual ones of the plurality of wireless communication base stations, the information including location information for individual wireless communication base stations.

7. In a wireless personal communication system;

a plurality of wireless personal communication base units each connected to interface with an ISDN (Integrated Services Digital Network) switch of a Public Switched Telephone Network and each having means for radio communication with each other and each having memory storage means to store identities of neighboring wireless communication base units;

a mobile telephone terminal registered with one of the plurality of wireless communication base units; each of the plurality of wireless communication units having means for effecting re-registration of the mobile telephone terminal as it moves throughout a PCS (Personal Communication Service) coverage area;

each of the plurality of wireless personal communication base units being connected to an advanced intelligent network included in the public switched telephone network;

the advanced intelligent network being operative for routing calls to selected ones of the plurality of wireless communication base unit where the desired mobile terminal to be called is registered;

the wireless personal communication base unit including means for paging a desired mobile terminal on a digital setup channel;

the wireless personal communication base unit accepting a response of the mobile terminal proceeding to set up call; and establish a radio frequency time slot channel;

a main controller included within the wireless personal communication base unit operative to configure the RF (Radio Frequency) transmitter of the base unit to tune to the assigned frequency channel and connect the audio path between the baseband processor, and further operative to facilitate handoff of the mobile terminal in response to signal strength measurements and data stored in the means to store identities;

interface sub-modules contained within the Wireless Personal for connecting to the audio path; and means for terminating the call by a line disconnection.

8. In a wireless personal communication system; as claimed in claim 7;

means for scanning RF channels and taking RSSI (Received Signal Strength Indicator) measurements;

means for identifying channels that have RSSI measurements below a certain threshold; means for setting priority service in will be dependent upon the level of RSSI, measures of nearby wireless personal communication base units, and storing these levels in an individual threshold table;

means for identifying information contained in these tables as; RSSI less than a RSSI minimum, RSSI more than a RSSI maximum;

adjusting power in the wireless communication base unit in response to identifying information to provide adequately powered service to a mobile terminal in a given registration area.

* * * * *